US009033665B2

(12) United States Patent
Kim

(10) Patent No.: US 9,033,665 B2
(45) Date of Patent: May 19, 2015

(54) PROPULSION DEVICE USING FLUID FLOW

(76) Inventor: Nak Hwe Kim, Geoje-si (KR)

( * ) Notice: Subject to any disclaimer, the term of this patent is extended or adjusted under 35 U.S.C. 154(b) by 558 days.

(21) Appl. No.: 13/393,175

(22) PCT Filed: Sep. 7, 2010

(86) PCT No.: PCT/KR2010/006063
§ 371 (c)(1),
(2), (4) Date: Feb. 28, 2012

(87) PCT Pub. No.: WO2011/031051
PCT Pub. Date: Mar. 17, 2011

(65) Prior Publication Data
US 2012/0156038 A1 Jun. 21, 2012

(30) Foreign Application Priority Data

Sep. 8, 2009 (KR) .................. 10-2009-0084509
Sep. 6, 2010 (KR) .................. 10-2010-0087061

(51) Int. Cl.
*B63H 9/00* (2006.01)
*B64C 3/14* (2006.01)
*B64C 21/04* (2006.01)
*B64C 23/04* (2006.01)
*B62D 25/12* (2006.01)
*B60K 16/00* (2006.01)

(52) U.S. Cl.
CPC *B63H 9/00* (2013.01); *B64C 3/141* (2013.01); *B64C 21/04* (2013.01); *B64C 23/04* (2013.01); *Y02T 50/166* (2013.01); *B62D 25/12* (2013.01); *B60K 2016/006* (2013.01)

(58) Field of Classification Search
CPC .......... B63H 9/00; B64C 3/141; B64C 21/04; B64C 23/04; B62D 25/12; Y02T 50/166
USPC .................. 416/235, 236 R, 228, 241 R
See application file for complete search history.

(56) References Cited

U.S. PATENT DOCUMENTS

| 4,455,045 | A | * | 6/1984 | Wheeler | 296/181.5 |
| 4,718,620 | A | * | 1/1988 | Braden et al. | 244/130 |
| 5,598,990 | A | * | 2/1997 | Farokhi et al. | 244/200.1 |
| 7,048,505 | B2 | * | 5/2006 | Segota et al. | 415/191 |
| 2004/0037162 | A1 | * | 2/2004 | Flohr et al. | 366/181.5 |
| 2010/0260614 | A1 | * | 10/2010 | Fuglsang et al. | 416/241 R |

FOREIGN PATENT DOCUMENTS

| KR | 10-1987-0001104 B1 | 6/1987 |
| KR | 10-1989-0000314 B1 | 3/1989 |
| KR | 10-0840870 B1 | 6/2008 |

* cited by examiner

*Primary Examiner* — Edward Look
*Assistant Examiner* — William Grigos
(74) *Attorney, Agent, or Firm* — Patent Office of Dr. Chung Park

(57) ABSTRACT

A propulsion device using fluid flow quickly discharges the vortex flow generated on an upper surface of the propulsion device to the outside to improve the propulsion and thrust of transportation means provided with the propulsion device. For this purpose, the propulsion device includes a fluid storage unit in which a downwardly curved fluid storage surface is formed between a first inlet line and a first outlet line such that a fluid storage space is formed on the fluid storage surface. A fluid flow unit in which a downwardly curved fluid flow surface is formed between a second inlet line and a second outlet line which are outwardly and backwardly inclined such that a fluid flow space is formed on the fluid flow surface. The fluid flow surface adjacent to the second outlet line becomes gradually flattened as it extends outwardly.

12 Claims, 6 Drawing Sheets

PROPULSION DEVICE USING FLUID FLOW

TECHNICAL FIELD

The present invention relates to a propulsion device using fluid flow, which quickly discharges the vortex flow generated on an upper surface of the propulsion device to the outside to improve the propulsion of a product provided with the propulsion device.

BACKGROUND TECHNIQUE

Bernoulli's theorem is a law which quantitatively shows the relationship among the velocity, pressure and height of flowing fluid, and is induced from the fact that the sum of the potential energy and the kinetic energy of a fluid is constant in the case that the fluid is an ideal fluid that is inviscid and incompressible and flows regularly. Bernoulli's theorem states that for an inviscid flow, an increase in the speed of the fluid occurs simultaneously with a decrease in pressure and vice versa. In modern everyday life there are many observations that can be successfully explained by application of Bernoulli's theorem.

FIG. 1 shows an aircraft wing as a typical example of the application of Bernoulli's theorem, wherein in a sectional view, the wing has a bottom surface formed in the shape of a straight line and a top surface formed in the shape of a curve that is concave upwards. In other words, the same fluid flows on a first point where the wind is first applied to the wing and a last point where the fluid gathers again. In order to reach a same point in a same time, air on the top surface of the wing has to move a relatively longer distance that air on the bottom surface of the wing so that the air on the top surface of the wing increases in velocity rather that the air on the bottom surface.

Then, due to the difference in velocity, the pressure on the surfaces of the wing will be relatively lower above than below and this pressure difference results in an upwards lift force, which enables the aircraft to lift.

However, a general aircraft wing using Bernoulli's theorem as discussed above is in close relationship with the generation of lift force that enables the aircraft to lift, but has nothing to do with the thrust increase operations of transfer means such as vehicles and ships except aircraft.

FIG. 2 is a view for explaining the vortex flow of cavity flow that is generated in a flow station.

FIG. 3a shows a state that the flow of a fluid rotates in position and generates an unstable vortex flow when the fluid flows forwards, and FIG. 3b shows a state that the flow direction of a fluid may be stably induced in a direction as desired by a user in the case that a change in angle is applied to the flow of the fluid at a side.

DETAILED DESCRIPTION OF INVENTION

Technical Problem

The present invention is derived to resolve the problems of the prior art as discussed above and has an object to provide a propulsion device using fluid flow, which quickly discharges the vortex flow generated on an upper surface of the propulsion device to the outside to improve the propulsion of a product provided with the propulsion device.

The Task Solution Means

In order to achieve the above and any other objects of the present invention, according to one aspect of the present invention there is provided a propulsion device using fluid flow, which comprises: a fluid storage unit, in which a downwardly curved fluid storage surface is formed between a first inlet line at a front side, through which fluid is introduced, and a first outlet line at a rear side, through which fluid is discharged, such that a fluid storage space is formed on the fluid storage surface, and a barrier wall is formed at a side of the fluid storage surface; and a fluid flow unit, in which a second inlet line is connected to the end of the first inlet line, a second outlet line is connected to the end of the first outlet line, and a downwardly curved fluid flow surface is formed between the second inlet line and the second outlet line, which are outwardly and backwardly inclined such that a fluid flow space is formed on the fluid flow surface, wherein a portion between the second inlet line and the second outlet line becomes gradually narrow as it extends outwardly and the fluid flow surface adjacent to the second outlet line becomes gradually flattened as it extends outwardly.

Meanwhile, according to another aspect of the present invention there is provided a propulsion device using fluid flow, which comprises: a fluid storage unit, in which a downwardly curved fluid storage surface is formed between a first inlet line at a front side, through which fluid is introduced, and a first outlet line at a rear side, through which fluid is discharged, such that a fluid storage space is formed on the fluid storage surface by forming a part of the first outlet line that is adjacent to the fluid storage surface to be curved upwards, wherein ends of the first inlet line and the first outlet line are connected to each other; and a fluid flow unit, in which a second inlet line is formed in the shape of a curve and connected to the end of the first inlet line, a second outlet line is formed in the shape of a curve and connected to the end of the first outlet line, the second inlet line is bent backwards and a downwardly curved fluid flow surface is formed between the second inlet line and the second outlet line, which are outwardly and backwardly inclined such that a fluid flow space is formed on the fluid flow surface, wherein a portion between the second inlet line and the second outlet line becomes gradually narrow as it extends outwardly and the fluid flow surface adjacent to the second outlet line becomes gradually flattened as it extends outwardly.

Herein, a right and left length of the fluid storage surface is formed to be longer as an amount of fluid intended to be introduced into the fluid storage space increases.

Further, a right and left length of the fluid flow surface is formed to be longer as a flowing speed of a fluid intended to flow in the fluid flow space increases.

Furthermore, the curved fluid flow surface, which is connected to the second inlet line, becomes bent more downwards as the speed of a fluid contacting the first and second inlet lines increases.

Moreover, a rear inclination angle of the fluid flow surface becomes larger backwards as the speed of a fluid contacting the first and second inlet lines increases.

Effect of Invention

The above-described configuration of the propulsion device of the present invention in view of the task solution means is advantageous in that the fluid introduced into the fluid storage space and the fluid flow space flows in vortex flow to increase pressure, the fluid flow space gradually narrows as it extends toward an end of the fluid flow surface so as to quickly discharge the fluid to the end of the fluid flow surface, and the shape of the fluid flow surface is formed to be gradually flattened as it extends toward the end thereof so as to increase fluid flow velocity and improve the propulsion and thrust of transportation means provided with the propulsion device.

Further, it is possible to change the amount and the flowing velocity of a fluid that is leaked along the fluid flow surface through a change in the right and left length of the fluid storage surface and fluid flow surface. In particular, it is possible to increase the amount and the flowing velocity of a fluid through a change in the bent degree of the curvature and the backward inclination of the fluid flow surface according to the fluid introducing velocity, thereby further increasing the thrust of a transfer means.

BRIEF DESCRIPTION OF DRAWINGS

Illustrative aspects of the invention will be described in detail with reference to the following figures wherein.

BEST MODE FOR CARRYING OUT INVENTION

Hereinafter, preferred embodiments of the present invention will be described in detail with reference to the accompanying drawings.

A propulsion device according to the present invention may be formed to an outside frame section of each transfer means that is subject to friction with a fluid among transfer means which move by receiving predetermined power. In particular, the propulsion system of the propulsion device according to the present invention is employed in the transfer means such as a ship, a submarine, an aircraft, a vehicle or the like so as to double the thrust of each of the transfer means.

Figure 1:
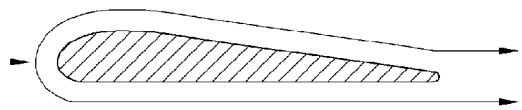
FIG. 1 is a sectional view showing the structure of fluid flowing in a wing of a general plane.
Figure 2:
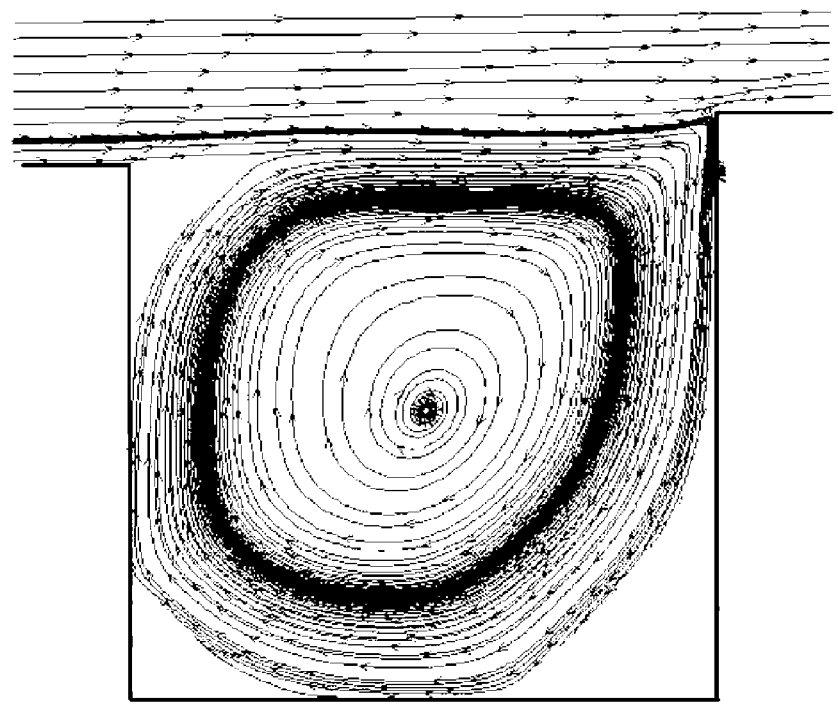
FIG. 2 is a view for explaining the vortex flow of cavity flow that is generated in a flow station.
Figure 3A:
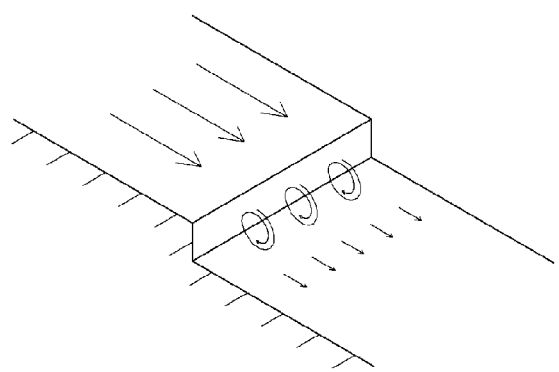
FIG. 3a is a view for explaining the state of an unstable vortex flow when fluid flows forward.
Figure 3B:
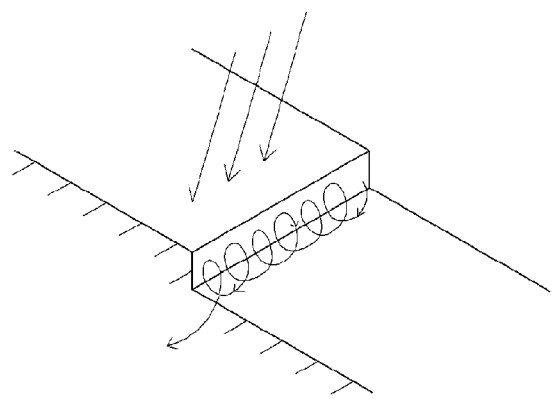
FIG. 3b is a view for explaining a state that a stable vortex flow is formed when fluid flows in an inclined direction.
Figure 4:
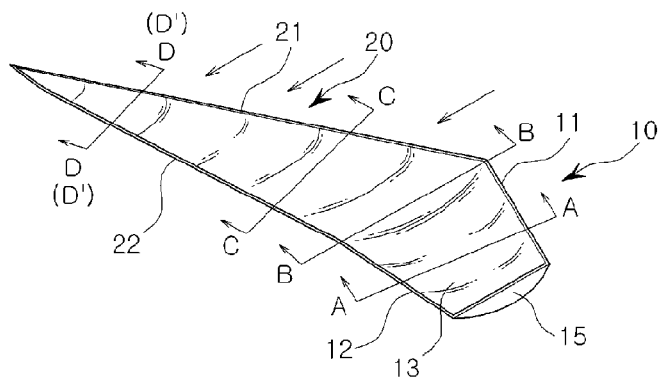
FIG. 4 is a perspective view showing the shape of a propulsion device according to a first embodiment of the present invention.
Figure 10:
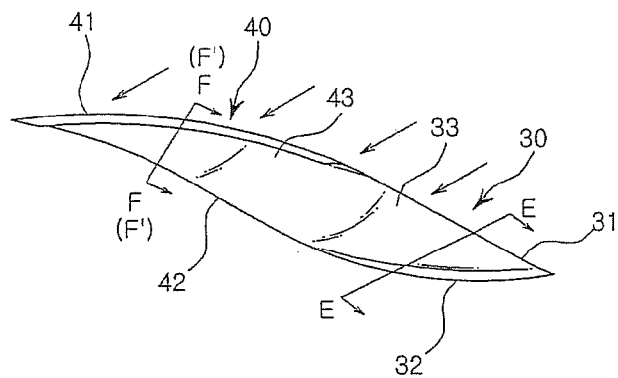
FIG. 10 is a perspective view showing the shape of a propulsion device according to a second embodiment of the present invention.

In other words, in the case that the propulsion device of the present invention is employed in a vehicle, two propulsion devices as shown in FIG. 4 or FIG. 10 may be symmetrically formed at both sides of a bonnet with respect to the center of the bonnet.

Meanwhile, FIG. 4 to FIG. 9 show a propulsion device using fluid flow according to a first preferred embodiment of the present invention, which is mainly includes a fluid storage unit 10 and a fluid flow section 20.

Figure 5A:
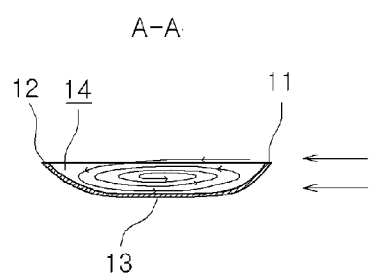
FIG. 5a to FIG. 5d are sectional views respectively showing the propulsion device taken along lines A-A to D-D in FIG. 4.
Figure 5B:
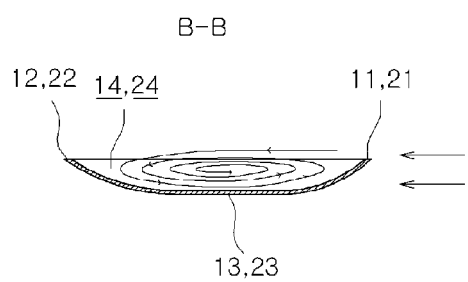
Figure 5C:
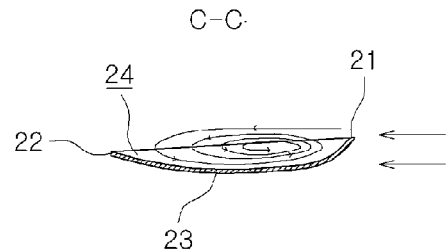
Figure 5D:
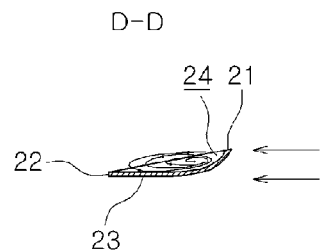

Referring to FIG. 4 to FIG. 5d in more detail, first a fluid storage unit 10 is formed in the shape of an approximately trapezoid and positioned at one side of the propulsion device. A first inlet line 11 is formed at a front surface portion of the fluid storage unit 10 where a fluid is introduced, wherein the first inlet line 11 has one side end that is inclined backwards. A first outlet line 12 is formed at the rear portion of the first inlet line 11, where the fluid leaks.

And, a fluid storage surface 13 is formed to be curved downwards between the first inlet line 11 and the first outlet line 12, and a fluid storage space 14 formed on the fluid storage surface 13. Further, a barrier wall 15 is formed at a side of the fluid storage surface 13 by horizontally finishing one side end of the first inlet line 11 and one side end of the first outlet line 12.

Figure 7:
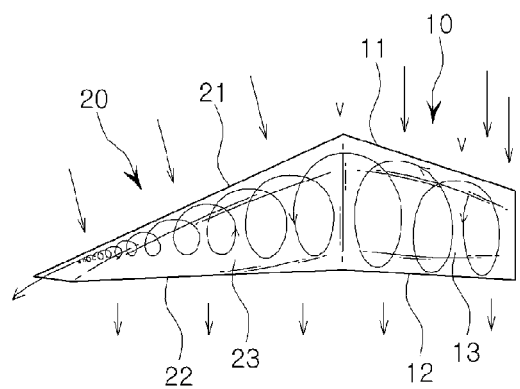
FIG. 7 is a plane view for longitudinally showing the shape of a fluid storage unit of FIG. 4.

Herein, in order to increase the amount of fluid that is to be introduced into the fluid storage space 14 as shown in FIG. 7, the length of the first inlet line 11 and the first outlet line 12 is extended such that the length of the fluid storage surface 13 in the right and left direction may be formed longer. Accordingly, the fluid that is collected to the fluid storage unit 10 may be flown to the fluid flow section 20 by a larger amount in a shorter time.

Figure 6:
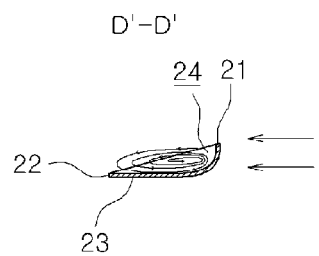
FIG. 6 is a sectional view of a fluid flow surface of the sectional view taken along line D-D in FIG. 5d, wherein the fluid flow surface is bent more than that taken along line D'-D'.

Subsequently, as shown in FIG. 4 to FIG. 6, the fluid flow section 20 is formed in the shape of an approximately triangle and positioned at the other side of the propulsion device. A second inlet line 21 is formed at a front surface portion of the fluid flow section 20 where a fluid is introduced, wherein the second inlet line 21 has one side end that is connected to the end of the first outlet line 11 and the other side end that is inclined outside backwards. A second outlet line 22 is formed at the rear portion of the second inlet line 21, where the fluid leaks. The second outlet line 22 has one side end that is connected to the first outlet line 12 and the other side end that is formed to be inclined backwards while being connected to the second inlet line 21.

Further, as shown in FIG. 5a to FIG. 5d, a fluid flow surface 23 is formed such that a sectional shape thereof is formed to be curved downwards between the second inlet line 21 and the second outlet line 22, and a fluid flow space 24 is formed on the fluid flow surface 23. Herein, a portion between the second inlet line 21 and the second outlet line 22, which form the fluid flow surface 23, becomes gradually narrow as it extends outwardly, and the fluid flow surface 23 adjacent to the second outlet line 22 is formed such that the fluid flow surface 23 becomes gradually flattened as it extends outwardly. Accordingly, vortex flow that flows along the fluid flow surface 23 to the outside may be collected to the end portion so as to be dispersed.

Figure 8:
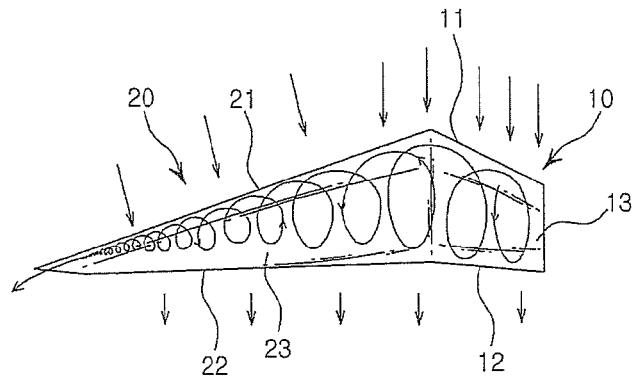
FIG. 8 is a plane view for longitudinally showing the shape of a fluid storage unit of FIG. 4.

Herein, in order to increase the speed of a fluid that flows in the fluid flow space 24, as shown in FIG. 8, the length of the second inlet line 21 and the second outlet line 22 is extended such that the length of the fluid flow surface 23 in the right and left direction may be formed longer. Accordingly, the fluid that is discharged via the fluid flow section 20 may be more increased and the flowing velocity of the fluid may be increased.

Further, in the case that the fluid, which comes into contact with the first inlet line 11 and the second inlet line 21, is introduced into the fluid storage space 14 and the fluid flow space 24 at a high speed, as shown in FIG. 6, the amount of the fluid that is introduced into the fluid flow space 24 may be more increased by forming the curved surface of the fluid flow surface 23 that is adjacent to the second inlet line 21 to be more curved downwards. That is, as the velocity of the fluid that comes into contact with the second inlet line 21 is increased, the curved surface of the fluid flow surface 23 is formed to be more bent downwards.

Figure 9:
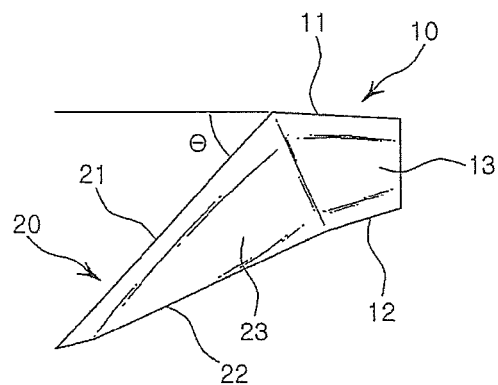
FIG. 9 is a plane view for longitudinally showing the shape of a fluid storage unit of FIG. 4, wherein the rear side of the fluid storage unit is inclined backwards.

Further, in the case that the fluid, which comes into contact with the first inlet line 11 and the second inlet line 21, is introduced into the fluid storage space 14 and the fluid flow space 24 at a high speed, as shown in FIG. 9, the amount of the fluid that is introduced into the fluid flow space 24 may be more increased by changing an inclination angle θ of the fluid flow surface 23 such that the inclination angle θ is more inclined backwards. That is, as the velocity of the fluid that comes into contact with the first and second inlet lines 11, 21 is increased, the backward inclination angle θ of the fluid flow surface 23 is increased.

Meanwhile, FIG. 10 to FIG. 15 show a propulsion device using fluid flow according to second preferred embodiment of the present invention, which is mainly includes a fluid storage unit 30 and a fluid flow section 40.

Figure 11A:
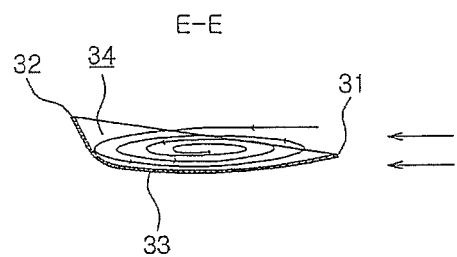
FIG. 11a and FIG. 11b are sectional views respectively showing the propulsion device taken along lines E-E and F-F in FIG. 4.
Figure 11B:
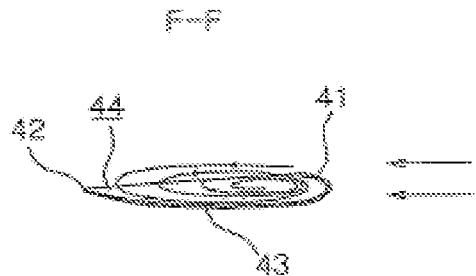

Referring to FIG. 10 to FIG. 11b in more detail, first a fluid storage unit 30 is formed in the shape of an approximately triangle having sharp corners and positioned at one side of the propulsion device. A first inlet line 31 is formed at a front surface portion of the fluid storage unit 30 where a fluid is introduced, and a first outlet line 32 is formed at the rear portion of the first inlet line 31, where the fluid leaks, wherein ends of the first inlet line 31 and the first outlet line 32 are formed to be connected to each other.

And, as shown in FIG. 11a, a fluid storage surface 33 is formed such that a sectional shape thereof is formed to have a curved surface in the shape of a streamline between the first inlet line 31 and the first outlet line 32, and a part of the first outlet line 32 that is adjacent to the fluid storage surface 33 is formed to be curved upwards, so that fluid storage space 34 is formed on the fluid storage surface 33.

Figure 12:
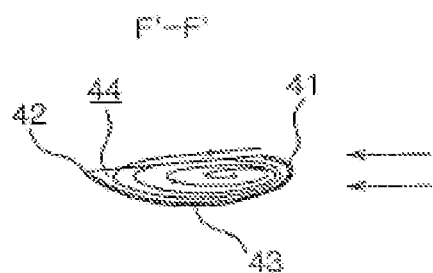
FIG. 12 is a sectional view of a fluid flow surface of the sectional view taken along line F'-F' in FIG. 4, wherein the fluid flow surface is bent more than that taken along line D'-D'.
Figure 13:
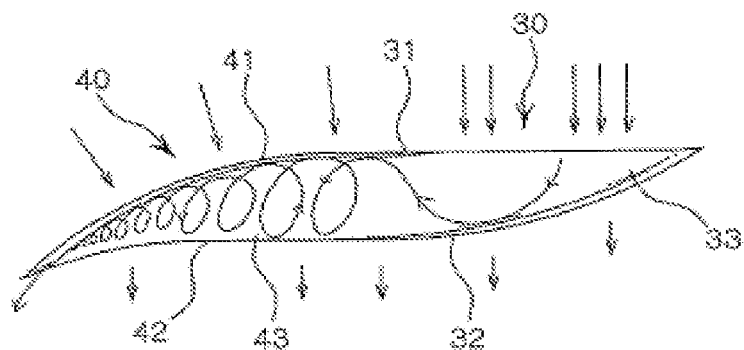
FIG. 13 is a plane view for longitudinally showing the shape of a fluid storage unit of FIG. 10.

Herein, in order to increase the amount of fluid that is to be introduced into the fluid storage space 34, as shown in FIG. 13, the length of the first inlet line 31 and the first outlet line 32 is extended such that the length of the fluid storage surface 33 in the right and left direction may be formed longer. Accordingly, the fluid that is collected to the fluid storage unit 30 may be flown to the fluid flow section 40 by a larger amount in a shorter time. Subsequently, as shown in FIG. 10 to FIG. 12, the fluid flow section 40 is formed in the shape of an approximately triangle having sharp corners and positioned at the other side of the propulsion device. A second inlet line 41 is formed in the shape of a natural curve at a front surface portion of the fluid flow section 40 where a fluid is introduced, wherein the second inlet line 41 has one side end that is connected to the end of the first inlet line 31 and the other side end that is inclined outside backwards. A second outlet line 22 is formed at the rear portion of the second inlet line 21, where the fluid leaks.

And, a second outlet line 42 is formed at the rear portion of the second inlet line 41, where the fluid leaks. The second outlet line 42 has one side end that is connected to the first outlet line 32 and an outside end that is formed to be inclined backwards while being connected to an outside end of the second inlet line 41.

Further, as shown in FIG. 11b, a fluid flow surface 43 is formed such that a sectional shape thereof is curved downwards so as to have a curved surface in the shape of a streamline between the second inlet line 41 and the second outlet line 42, and a fluid flow space 4 is formed on the second inlet line 41.

Further, a portion between the second inlet line 41 and the second outlet line 42, which form the fluid flow surface 43, becomes gradually narrow as it extends outwardly, and the fluid flow surface 43 adjacent to the second outlet line 42 is formed such that the fluid flow surface 433 becomes gradually flattened as it extends outwardly. Accordingly, vortex flow that flows along the fluid flow surface 43 towards the outside may be collected to the end portion of the fluid flow surface 43 and then dispersed to the outside.

Figure 14:
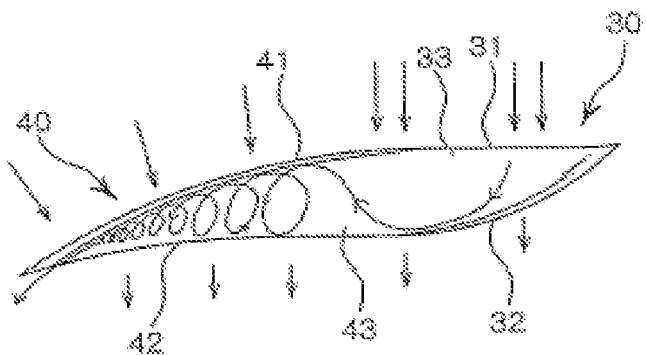
FIG. 14 is a plane view for longitudinally showing the shape of a fluid storage unit of FIG. 10.

Herein, in order to increase the speed of a fluid that flows in the fluid flow space 44, as shown in FIG. 14, the length of the second inlet line 41 and the second outlet line 42 is extended such that the length of the fluid flow surface 43 in the right and left direction may be formed longer. Accordingly, the fluid that is discharged via the fluid flow section 40 may be more increased and the flowing velocity of the fluid may be increased.

Further, in the case that the fluid, which comes into contact with the first inlet line 31 and the second inlet line 41, is introduced into the fluid storage space 34 and the fluid flow space 44 at a high speed, as shown in FIG. 12, the amount of the fluid that is introduced into the fluid flow space 44 may be more increased by forming the curved surface of the fluid flow surface 43 that is adjacent to the second inlet line 41 to be more curved downwards. That is, as the velocity of the fluid that comes into contact with the second inlet line 41 is increased, the curved surface of the fluid flow surface 43 is formed to be more bent downwards.

Figure 15:
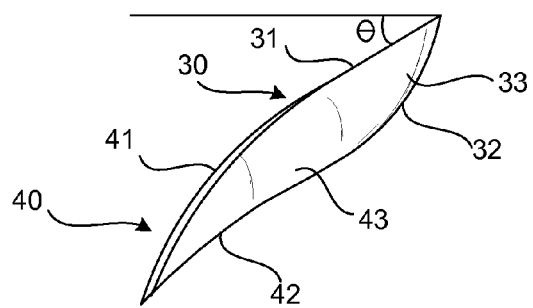
FIG. 15 is a plane view for longitudinally showing the shape of a fluid storage unit of FIG. 10, wherein the rear side of the fluid storage unit is inclined backwards.

Further, in the case that the fluid, which comes into contact with the first inlet line 31 and the second inlet line 41, is introduced into the fluid storage space 34 and the fluid flow space 44 at a high speed, as shown in FIG. 15, the amount of the fluid that is introduced into the fluid flow space 44 may be more increased by changing an inclination angle θ of the fluid flow surface 43 such that the inclination angle θ is more inclined backwards. That is, as the velocity of the fluid that comes into contact with the first and second inlet lines 31, 41 is increased, the backward inclination angle θ of the fluid flow surface 43 is increased.

Now, the operations and effect of the present invention as constructed above will be described in more detail.

A propulsion device according to the present invention is formed to an outside frame section of a transfer means such as a ship, a submarine, an aircraft, a vehicle or the like in the advancing direction of the transfer means.

As the transfer means provided with the propulsion device moves in a direction in the state, the fluid collides against the first inlet line 11, 31 and the second inlet line 21, 41 and is introduced into the fluid storage space 14, 34 and the fluid flow space 24, 44.

The fluid that is introduced into the fluid storage space 14, 34 and the fluid flow space 24, 44 flows spirally, thereby generating vortex flow, so that pressure applied to the fluid storage space 14, 34 and the fluid flow space 24, 44 increases according to Bernoulli's theorem.

Therefore, in the case of the propulsion device as shown in the first embodiment, the fluid in the state of the vortex flow introduced into the fluid storage space 14 collides against the barrier wall 15 and then flows into the fluid flow space 14, so that an increased amount of the fluid may flow into the fluid flow space 14.

Further, in the case of the propulsion device as shown in the second embodiment, the fluid introduced into the fluid storage space 34 collides against the curved surface of the first outlet line 32 and then flows into the fluid flow space 44, so that an increased amount of the fluid may flow into the fluid flow space 44.

The fluid introduced from the fluid storage space 14, 34 and the fluid in the state of the vortex flow introduced via the second inlet line 21, 41 flows from a wide space to a narrow space in a short time according to Bernoulli's theorem so that the fluid may leak to the end portion of the fluid flow surface 23, 43 in a short time, as the fluid flow space 24, 44 is formed in the shape that becomes gradually narrow towards the end portions of the fluid flow surface 23, 43.

Further, the leaked fluid in the shape of vortex flow is collected at the end portions of the fluid flow surface 23 43 so that the flowing velocity of the fluid may be improved thereby doubling the thrust and the propulsion of the transfer means provided with the propulsion device, as the second outlet line 22, 42 is formed in the shape that becomes gradually flattened towards the end portions.

Furthermore, in the case that the length of the fluid storage surface 13, 33 in the right and left direction is formed to be longer, or the length of the fluid flow surface 23, 43 in the right and left direction is formed to be longer, the amount of the fluid introduced into the fluid storage space 14, 34 or the fluid flow space 24, 44 increases. Therefore, not only the amount of the fluid that leaks along the fluid flow surface 23 43 to the outside may be increased but also the fluid leaks at a faster velocity, thereby improving the thrust of the transfer means.

In addition, in the case that the velocity of the fluid that collides against the front surface of the propulsion device becomes increased due to the fast velocity of the transfer means, the velocity of the fluid discharged along the fluid flow surface 23, 43 may be increased by forming the curved surface of the fluid flow surface 23, 43 that is adjacent to the second inlet line 21, 41 to be more bent downwards or to be more inclined towards the rear portion of the fluid flow surface 23, 43, thereby improving the thrust of the transfer means.

Figure 16A:
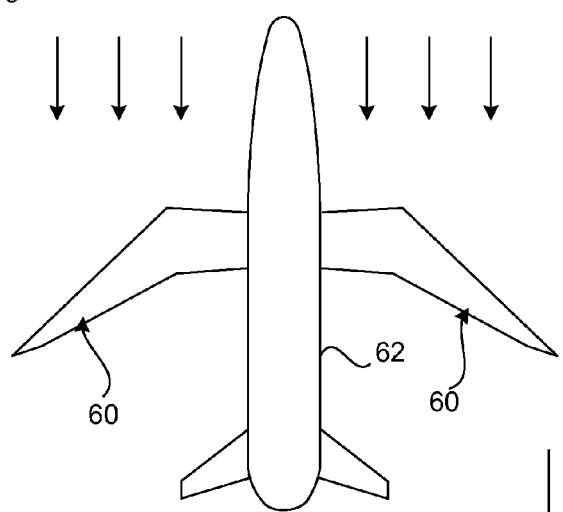
FIG. 16a is a plane top view of an airplane having a pair of propulsion devices according to one embodiment of the present invention.
Figure 16B:
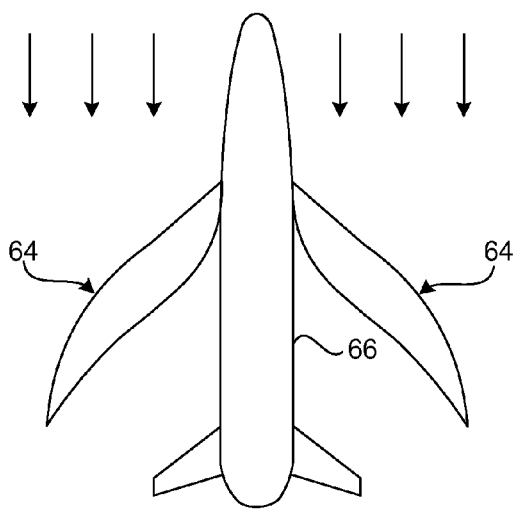
FIG. 16b is a plane top view of an airplane having a pair of propulsion devices according to another embodiment of the present invention.

FIG. 16*a* is a plane top view of an airplane having a pair of propulsion devices according to one embodiment of the present invention. As depicted, the pair of propulsion devices 60, each of which is similar to the propulsion device shown in FIG. 4, is attached to a fuselage of an airplane 60. FIG. 16*b* is a plane top view of an airplane having a pair of propulsion devices according to another embodiment of the present invention. As depicted, the pair of propulsion devices 64, each of which is similar to the propulsion device shown in FIG. 15, is attached to a fuselage of an airplane 66.

While the invention has been described with reference to the above embodiments thereof, the invention is not limited thereto. It will be understood by those of ordinary skill in the art that various changes in form and details may be made therein within the invention.

What is claimed is:

1. A propulsion device using fluid flow, comprising:
a fluid storage unit, in which a downwardly curved fluid storage surface is formed between a first inlet line at a front side, through which fluid is introduced, and a first outlet line at a rear side, through which fluid is discharged, such that a fluid storage space is formed on the fluid storage surface, and a barrier wall is formed at a side of the fluid storage surface and to be attached to an outside frame section of a transfer means; and
a fluid flow unit, in which a second inlet line is connected to the end of the first inlet line, a second outlet line is connected to the end of the first outlet line, and a downwardly curved fluid flow surface is formed between the second inlet line and the second outlet line, which are outwardly and backwardly inclined such that a fluid flow space is formed on the fluid flow surface,
wherein a separation between the second inlet line and the second outlet line gradually decreases as progressing in a downstream direction of flow inside the fluid flow unit and the fluid flow surface adjacent to the second outlet line becomes gradually flattened as progressing in the downstream direction.

2. A propulsion device using fluid flow, comprising:
a fluid storage unit, in which a downwardly curved fluid storage surface is formed between a first inlet line at a front side, through which fluid is introduced, and a first outlet line at a rear side, through which fluid is discharged, such that a fluid storage space is formed on the fluid storage surface by forming a part of the first outlet line that is adjacent to the fluid storage surface to be curved upwards, wherein ends of the first inlet line and the first outlet line are connected to each other and to be attached to an outside frame section of a transfer means; and
a fluid flow unit, in which a second inlet line is formed in the shape of a curve and connected to the end of the first inlet line, a second outlet line is formed in the shape of a curve and connected to the end of the first outlet line, the second inlet line is bent backwards and a downwardly curved fluid flow surface is formed between the second inlet line and the second outlet line, which are outwardly and backwardly inclined such that a fluid flow space is formed on the fluid flow surface,
wherein a separation between the second inlet line and the second outlet line gradually decreases as progressing in a downstream direction of flow inside the fluid flow unit and the fluid flow surface adjacent to the second outlet line becomes gradually flattened as progressing in the downstream direction.

3. The propulsion device using fluid flow according to claim 1, wherein, when a dimension of the fluid storage surface along a downstream direction is increased, an amount of fluid intended to be introduced into the fluid storage space increases.

4. The propulsion device using fluid flow according to claim 1, wherein, when a dimension of the fluid flow surface along a downstream direction is increased, a flowing speed of fluid in the fluid flow space increases.

5. The propulsion device using fluid flow according to claim 1, wherein the curved fluid flow surface, which is connected to the second inlet line becomes bent more downwards as a speed of fluid contacting the first and second inlet lines increases.

6. The propulsion device using fluid flow according to claim 1, wherein a rear inclination angle θ between the first inlet line and a line normal to a direction of incoming flow that contacts the first inlet line becomes larger as a speed of the incoming flow increases.

7. The propulsion device using fluid flow according to claim 2, wherein, when a dimension of the fluid storage surface along a downstream direction is increased, an amount of fluid intended to be introduced into the fluid storage space increases.

8. The propulsion device using fluid flow according to claim 2, wherein, when a dimension of the fluid flow surface along a downstream direction is increased, a flowing speed of fluid in the fluid flow space increases.

9. The propulsion device using fluid flow according to claim 2, wherein the curved fluid flow surface, which is connected to the second inlet line, becomes bent more downwards as the speed of fluid contacting the first and second inlet lines increases.

10. The propulsion device using fluid flow according to claim 2, wherein a rear inclination angle $\theta$ between the first inlet line and a line normal to a direction of incoming flow that contacts the first inlet line becomes larger as a speed of the incoming flow increases.

11. The propulsion device using fluid flow according to claim 1, wherein only one vortex is formed in the fluid flow unit and exits a tip portion of the second outlet line during operation.

12. The propulsion device using fluid flow according to claim 2, wherein only one vortex is formed in the fluid flow unit and exits a tip portion of the second outlet line during operation.

* * * * *